United States Patent [19]

Jourjine

[11] Patent Number: 4,809,193

[45] Date of Patent: Feb. 28, 1989

[54] MICROPROCESSOR ASSEMBLIES FORMING ADAPTIVE NEURAL NETWORKS

[76] Inventor: Alexander N. Jourjine, P.O. Box 425, Cambridge, Mass. 02142

[21] Appl. No.: 26,479

[22] Filed: Mar. 16, 1987

[51] Int. Cl.$^4$ .............. G02B 6/10; G06F 13/00; H04B 9/00; G06K 9/62

[52] U.S. Cl. .................. 364/513; 364/200; 364/900; 330/96.12; 330/96.1; 330/96.3; 382/15; 455/600; 455/607

[58] Field of Search .......... 364/513, 807, 131, 133, 364/900, 200; 455/606, 607; 382/15; 350/96.1-96.15

[56] References Cited

U.S. PATENT DOCUMENTS

| | | | |
|---|---|---|---|
| 3,103,648 | 9/1963 | Hartmanis | 364/900 |
| 4,087,159 | 5/1978 | Ulrich | 350/96.12 |
| 4,449,244 | 5/1984 | Kopainsky | 455/607 |
| 4,507,726 | 3/1985 | Grinberg et al. | 364/200 |
| 4,599,693 | 7/1986 | Denenberg | 382/15 |
| 4,641,374 | 2/1987 | Oyama | 455/606 |

OTHER PUBLICATIONS

*Applied Optics*, Nov. 1970, vol. 9, No. 11, P. H. Bartels, "Self-Optimizing, Self Learning System in Pictorial Pattern Recognition".

*IEEE ASSP Magazine*-vol. 4, No. 2, 4/87, Richard P. Lippman, "An Introduction to Computing with Neural Nets".

L. D. Jacket et al., "Artificial Neural Networks for Computing," *J. Vac. Sci. Technol.*, B4(1), Jan./Feb. 1986, pp. 61-63.

D. Psaltis et al., "Learning in Optical Neural Computers," *IEEE First International Conference on Neural Networks*, San Diego, Calif., Jun. 21-24, 1987, pp. III--549-III-555.

A. Sawchuk et al., "Dynamical Optical Interconnections for Parallel Processors," *SPIE*, vol. 625, *Optical Computing*, 1986, pp. 143-153.

L. A. Bergman et al., "Holographic Optical Interconnects for VLSI," *Optical Engineering*, Oct. 1986, vol. 25, No. 10, pp. 1109-1118.

M. K. Kilcoyne et al., "Optoelectronic Integrated Circuits for High Speed Signal Processing," *Optical Engineering*, Oct. 1986, vol. 25, No. 10, pp. 1119-1126.

L. Hutcheson et al., "Optical Interconnects Replace Hardwire," *IEEE Spectrum*, Mar. 1987, pp. 30-35.

P. R. Haugen et al., "Optical Interconnects for High Speed Computing," *Optical Engineering*, Oct. 1986, vol. 25, No. 10, pp. 1076-1084.

J. Goodman et al., "Optical Interconnections for VLSI Systems," *Proceedings of the IEEE*, vol. 72, No. 7, Jul. 1984, pp. 850-866.

*Primary Examiner*—Jerry Smith
*Assistant Examiner*—Paul Gordon
*Attorney, Agent, or Firm*—Hamilton, Brook, Smith & Reynolds

[57] ABSTRACT

Microprocessor assemblies are disclosed, which include a plurality of preprogrammed, cellular automaton microprocessors, a common radiant energy data waveguide into which said microprocessors can emit and from which said microprocessors can absorb modulated radiant energy signals, and a power supply radiant energy waveguide. Means are provided for each microprocessor to demodulate the absorbed signal and to modulate the emitted signal according to codes assigned to each said microprocessor. The common data waveguide provides for exchange of signals among the plurality of microprocessors. The relative degree of communication between two given microprocessors is determined by the degree to which the respective codes match. Said codes are subject to change. The change is determined by the demodulated inputs of the microprocessors. Means are provided for selective activation and deactivation of microprocessors through selective activation power supply. Changeability of the codes and the selective power supply provide for the means to induce a wide range of the desired patterns of connectivity and the desired degree of connectivity among the plurality of the microprocessors. There are also disclosed methods for making such microprocessor assemblies.

39 Claims, 7 Drawing Sheets

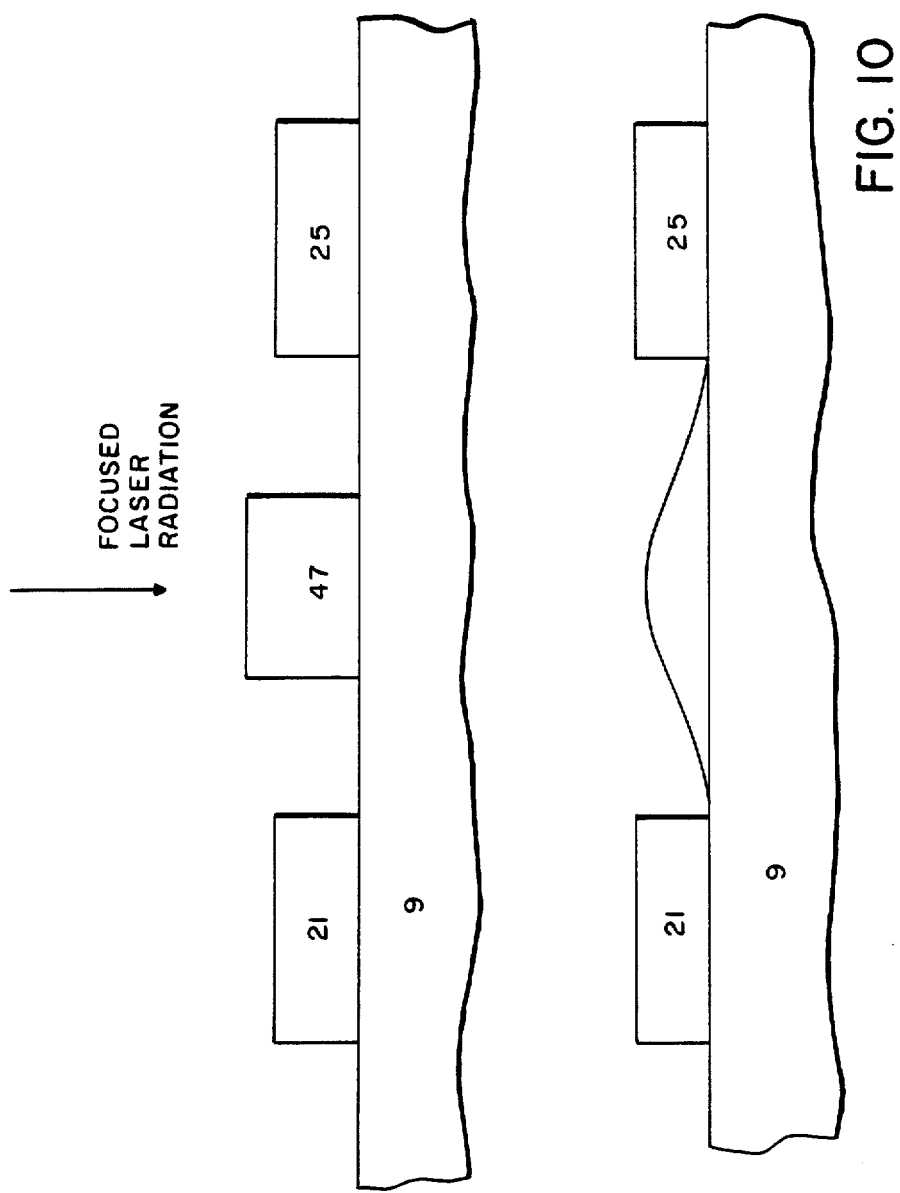

MICROPROCESSOR ASSEMBLIES FORMING ADAPTIVE NEURAL NETWORKS

FIELD OF THE INVENTION

The present invention relates to the optoelectronic, parallel architecture, adaptive neural network pattern recognition devices, where a large number of preprogrammed, cellular automaton microprocessors exchange the information about their internal states according to a changeable, dynamically determined interconnection pattern with a potentially large portion of the plurality of the microprocessors exchanging information with any given microprocessor at the same time.

BACKGROUND OF THE INVENTION

The central idea of the adaptive neural network computers, called neurocomputers, is to simulate the information processing architecture of the brain by linking together a large number of highly interconnected processors and making them to work in parallel. It is also assumed that there exist certain types of the processor information exchange dynamics, which makes it possible for a neurocomputer to learn from experience. Although there are difficulties with programming of general purpose computers working on the neural network principles, the performance of the brain in solving the pattern recognition problem clearly indicates the validity of the neural networks in this particular area.

In recent years the theory of neural networks was greatly advanced, among others, by Grossberg [Human Neurobiology, vol. 5, p. 1, 1986 and references therein], Hopfield [Biological Cybernetics vol. 52, p. 141, 1985 and references therein], Rumelhart [ISC Report 8506, University of California, San Diego and references therein], and Cooper [DTIC technical report #AD-A151 776]. A separate approach to the neural network theory, which is based on dynamics of certain functions defined on cell complexes, was developed by the author of this invention [A. N. Jourjine, Ph. D. Thesis, MIT 1984, unpublished; Phys Rev D31(1985)1443; Phys Rev D34(1986)3058; Quantum Filed Theory of Random Codes, 1987].

Digital computer simulations of various neural network theories confirm the fact that the neurocomputers can learn from experience and are capable of pattern recognition. Error propagation techniques were successfully used by Sejnowski et al. in addressing the voice recognition problem [T. J. Sejnowski and C. R. Rosenberg, NETtalk: a parallel network which learns to read aloud. Johns Hopkins University, January, 1986]. In addition, neural networks are very useful in solving complex optimization problems and in building Content Addressable Memories as demonstrated by Hopfield et al. [2] and Psaltis et al. [Appl. Optics 24(1985)1469].

The progress in building of hardware implementations of the neural networks has been limited. Because of the high degree of parallelism involved, neural networks are very inefficient when simulated on a digital computer. In order to utilize the advantages of the neural networks, one has to have a device with internal information processing architecture reflecting the architecture of the neural network. If a hardware implementation of a neural network is to be useful in solving pattern recognition problems for realistic data inputs, such as voice or visual image data, it is necessary to build a device with the following properties:

(1) a large number of independent information processors are linked together in a single device;

(2) each processor is preprogrammed and is either an analog processor, or a digital processor with a small volume of internal memory, i.e. is, what we call, cellular automaton microprocessor.

(3) each microprocessor is directly connected to a large number of other microprocessors, i.e. the absolute degree of connectivity is high;

(4) the ratio of absolute degree of connectivity to the total number of processors is relatively low, i.e. most of the processors are hidden units, that is are not linked directly to input and output;

(5) the connectivity pattern among the microprocessors is determined dynamically;

(6) changing of the connectivity pattern and the magnitude of the information exchange is relatively simple and is done locally by adjusting inner states of microprocessors;

(7) relative compactness and low power consumption by the device.

To justify the demands it is useful to mention that the brain, an example of neural network, has about 10 billion analog processors, each of which is connected to about 10 thousands others. This assembly consumes few hundred watts of power and is confined in a relatively small volume. It has been experimentally shown that the strength of intersynaptic connections changes as learning occurs in the brain and that the effective connectivity pattern depends on the relative timing of the "on" and "off" states of the neurons.

Attempts have been made at building implementations of neural networks in the form of VLSI circuits. At AT&T a fixed network has been put on the chip for use as a prototype CAM [L. D. Jackel et. al, J. Vac. Sci. Technol., B4(1986)61]. The problem with the VLSI implementations is that the interconnection pattern among the processors is static and the electrical interconnections take much of the space on the chip. There are also attempts to base neural network on purely optical processes using holograms [D. Psaltis et al. Appl. Optics 24(1985)1469; Scientific American, March(1987)88]. The problem with hologram based neural networks is that there everything is connected to everything and it is hard to reserve the hidden units, which are essential for learning as shown by Rumelhart [3]. At the present there is no hardware implementation of the adaptive neural network satisfying the above mentioned properties (1)–(7). On the other hand the software simulations of the neural networks on digital computers show that neural network implementations have a great advantage over conventional digital computers in the areas of pattern recognition and other areas of Artificial Intelligence. Thus a strong need exists for hardware implementation of adaptive neural networks, which satisfy the above mentioned properties (1)–(7).

SUMMARY OF THE INVENTION

This invention relates to an adaptive communications network and method of providing a high degree of connectivity for networks of a large number of parallel processors for use in pattern recognition and content addressable memory data processing devices, which simulate the neural network of the brain. In certain embodiments of the invention, it depends on making a large number of preprogrammed optoelectronic cellular automaton microprocessors, which form an integrated circuit array, to work in parallel by exchanging simultaneously the information about their internal state by the means of modulated radiant energy. Said radiant energy is emitted into and is absorbed from a common radiant energy data channel such as a waveguide or a common resonant radiant energy cavity. The output of each microprocessor consists of radiant energy, which is modulated according to a code, the output code. The input of each microprocessor consists of outputs of a part of the plurality of microprocessors. It is demodulated according to another code, the input code. The input code of each microprocessor determines the output code of same microprocessor. In some embodiments of the present invention, the modulation code is binary [8]. In others, it is integer valued. In certain embodiments of this invention, the radiant energy, emitted by the microprocessors, is coherent in one or more of its parameters. In others, the radiant energy is incoherent. For any two given microprocessors of the total plurality, the information exchange between the two microprocessors depends on the degree to which the corresponding input and output codes match. The input and the output codes of each microprocessor are subject to a change, according to a rule which depends on the demodulated input of each microprocessor. In certain embodiments of the present invention, the microprocessors of the assembly can be activated or deactivated independently of each other by means of selective power supply to some microprocessors and not to others. The plurality of codes, together with their ability to change and the selective power supply to subpluralities of the plurality of the microprocessors create an adaptive neural network such that a very wide range of connectivity patterns, connectivity degrees, and relative magnitudes of information exchange among a given number of microprocessors can be established dynamically and easily changed.

Smallness of said microprocessors and low power consumption provide for an advantageously large number of microprocessors to be linked in the dynamically determined interactive network, thus creating a massively parallel data processing device. The use of a common radiant energy data waveguide provides for an advantageously high degree of connectivity among the microprocessors.

In certain embodiments of the present invention, the device is incorporated in an automated pattern recognition device, called the Data Recognition Device, where it is used for extraction of features of patterns from data flows to which the Data Recognition Device is subjected. In other embodiments, it is incorporated in the Data Recognition Device as a content addressable memory device for storage and retrieval of the detected pattern features.

Various other features of the method and the apparatus of the present invention will become obvious to those skilled in the art upon reading the disclosure set forth hereinafter.

BRIEF DESCRIPTION OF THE DRAWINGS

In the drawings, which form an integral part of the specification and are to be read in conjunction therewith, and in which like reference numerals are employed to designate similar components in various views;

FIG. 10 is an illustration of the method of manufacturing of the deflection strip 23 shown on FIG. 4.

DETAILED DESCRIPTION OF THE PREFERRED EMBODIMENT

Figure 1:
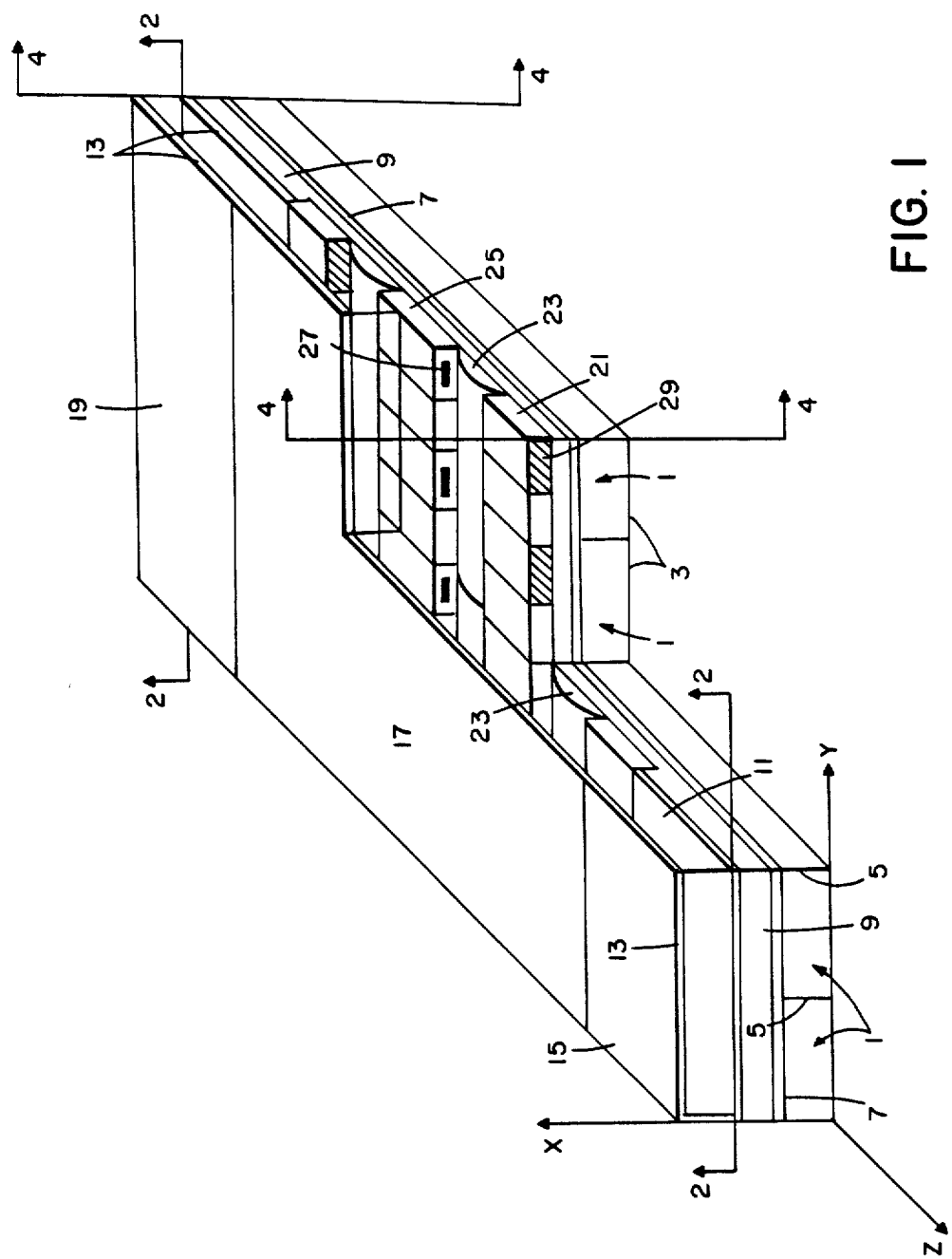
FIG. 1 is a cut-out view in perspective of the microprocessor assembly embodying the present invention.

Referring now to FIG. 1, a part of the microprocessor assembly is shown, which embodies the present invention. The assembly comprises a plurality of power waveguides 1, which share vertical partitions 5; a plurality of microprocessors sharing a common substrate 9; and the common radiant energy data waveguide 11. The lower and the vertical sides of the power waveguides 1 are made of conductive material, such as copper, or aluminum, which confine propagating radiant energy and serve as heat conductors. The height of the vertical partitions 5 is larger then the width of the horizontal walls 3 of the waveguides 1. The height of the vertical partitions 5 determines the lowest cutoff frequency. That cutoff frequency is chosen to lie below the range of the frequencies in the power supply radiant energy. The range of frequencies is chosen so as to cause an acceptable amount of attenuation. The power waveguides 1 are hollow and contain some gaseous substance such as air, which may be caused to circulate inside the waveguides in order to keep the assembly at the required operational temperature, such as 300 K.

The upper part of the plurality of the waveguides 1 consists of the substrate 9, which is also the substrate for the plurality of the microprocessors. The substrate 9 is of such material as necessary to fabricate semiconductor radiant energy detectors, and laser diodes or light emitting diodes, such as Silicon and/or Gallium Arsenide. On the bottommost part of the substrate 9 a thin layer 7 of some conducting material, such a silver, is deposited by vapor deposition methods, such as vapor phase epitaxy or similar, to produce a uniform layer of conductive material of thickness comparable to the skin depth for the deposited material for the highest frequency in the range to be used for power supply radiant energy. This thickness is on the order of 1 micrometer for frequencies in the range of 1 GHz. The reason for this requirement for the thickness of the conductive layer 7 is that it is necessary that the electric field of the propagating power supply radiant energy extends through the layer 7 to generate activation voltage for the microprocessors situated above the layer 7.

Figure 2:
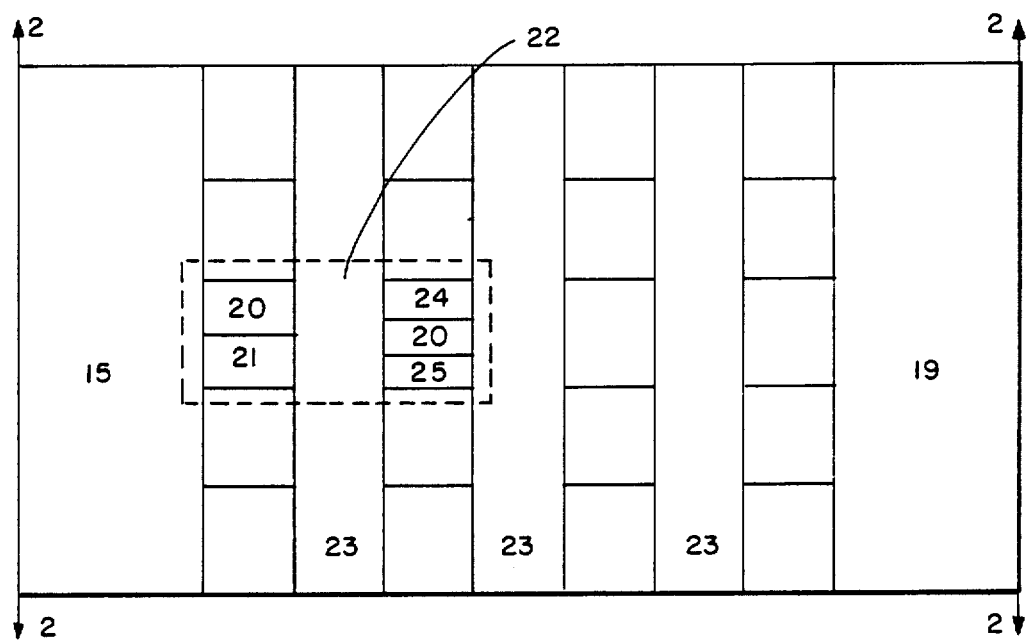
FIG. 2 is a view from above of the assembly cut in the plane 2—2.

Referring now to FIG. 2, a part of the plurality of the microprocessors is shown, as viewed from above the plane defined by lines 2—2 of FIG. 1. Each microprocessor 22 is comprised of a radiant energy detector 21, a radiant energy source 25, switches 20, and a logical circuit 24. Together with the deflection strips 23 the microprocessors 22 form a regular pattern.

Figure 3:
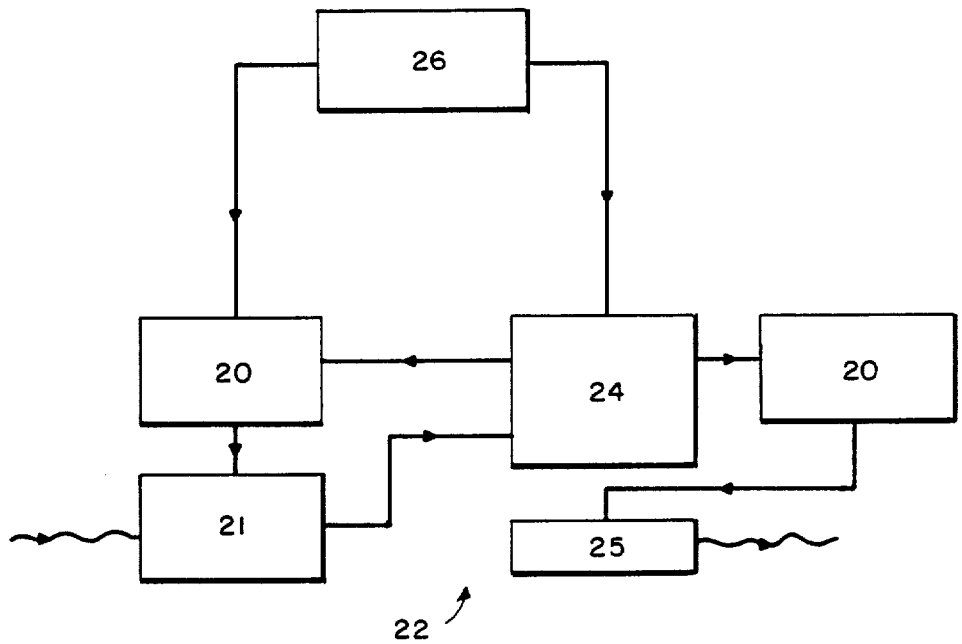
FIG. 3 is a block diagram of a single microprocessor.

Referring now again to FIG. 1, the radiant energy detectors 21, absorb the radiant energy data by the vertical surfaces 29. The active regions 27 of the radiant energy sources 25 emit modulated radiant energy into the data waveguide 11. The deflection strips 23 serve to focus the incident radiant energy on the surfaces 29 of the radiant energy detectors 21, and to deflect the radiant energy signal, emitted by the radiant energy sources 25, into the data waveguide 11. The data waveguide 11 comprises the data input waveguide 15, the information exchange chamber 17, and the data output waveguide 19. The plurality of microprocessors abuts the data waveguide 11 along the lower horizontal surface of the information exchange chamber 17. The data waveguide 11 is made of some dielectric material, gaseous, liquid or solid, which is most conducive for propagation of the radiant energy data in the near infrared 1.3 micrometer region, and is enclosed on all sides by a layer 13 of some dielectric material with the refractive index lower than that of the material of the data waveguide 11, so that total internal reflection occurs for the radiant energy data propagating through the data waveguide 11. Scatterring of the radiant energy data on the irregularities of the lower surface of the information exchange chamber 17 will cause a loss of data, when the scattered radiant energy will not undergo the total internal reflection. This loss will cause attenuation of the propagating external data with the attenuation constant on the order of 10 cm. This loss is necessary for operation of the microprocessor assembly because the connectivity patterns needed for application are such that the external data must be received only by the first few rows of the microprocessors, which are in the y direction. The same applies for the data emitted by the microprocessors inside the information exchange chamber 17. In effect, the data waveguide 11 is a thin optical film. The data input waveguide 15 is for feeding the external data into the information exchange chamber. The data output waveguide 19 is for coupling of the processed data to other devices for further processing or for dumping in the data sink, which is a cavity with highly absorbent inner walls Referring now to FIG. 3, a block diagram of a single microprocessor 22 is shown. The microprocessor 22 comprises a radiant energy detector 21, a radiant energy source 25, switches 20, and a logical circuit 24. The lines interconnecting the parts of the microprocessor depict propagation of signals. The microprocessors 22 receives the power for its operation from an outside source 26. The radiant energy detector 21 receives a radiant energy signal and converts it into an electric signal. The amplitude of the generated signal is made proportional to the total flux of the energy absorbed by the detector 21. This is done by an appropriate choice of the operating range of the detector 21. The electric signal travels into the logic circuit 24, which controls the switch 20. In its turn the switch 20 controls the supply of power to both detector 21 and the radiant energy source 25. The power supply to the detector 21 and the radiant energy source 25 is provided by the voltage induced in both elements by the power supply radiant energy, which passes through the power supply waveguide 1. For the wavelength of the power supply radiant energy on the order of few centimeters, the power supply comes in short pulses, whose duration varies from hundreds of picoseconds to infinity, depending on how close the frequency of the power supply radiant energy is to the cutoff frequency for the power supply waveguides. Thus, if there were no logical circuit, then the detector 21 and the radiant energy source 25 would have been activated with a uniform frequency half of the time and deactivated with the same frequency half of the time. When the switch 20 is in "off" position, it grounds the power supply 26 to both detector 21 and radiant energy source 25. This causes the microprocessor 22 to skip a beat in the uniform activation-deactivation sequence determined by the power supply radiant energy frequency. Switching switch 20 from "on" to "off" position and back at different times creates a sequence of activation for the microprocessor which can be represented by a binary sequence. The logical circuit 24 sends instructions to the switch 20 about the position of the switch depending on the total energy flux absorbed by the detector 21 during the time when the detector 21 was activated. In this particular embodiment of the present invention, the detector 21 is a PIN photodiode, whose response time is typically on the order of a hundred of picoseconds. That puts a limitation on the power supply radiant energy frequency to be less than 10 GHz In this particular embodiment of the present invention the modulation of power supply to microprocessors is binary. In other embodiments, employing more than one switch the power supply can be graded in magnitude according to the integer number of the switches involved, which are in the "on" position. This induces an integer valued code of the activation-deactivation sequence of the microprocessors. The binary sequence of the "on"-"off" positions of the switch is the input code of the microprocessor The same sequence is the output code of the microprocessor. In certain embodiments of the present invention the output code is not the same as the input code of a microprocessor. Depending on the relative response times of the detector and the radiant energy source, the output code may be a refinement of the input code and vice versa. When the switch 20 is "on" the radiant energy source 25 emits radiant energy signal, which after deflection by the deflection strip enters the data waveguide. In this particular embodiment of the present invention, the radiant energy source is a double heterojunction laser diode, made of appropriate material, such as doped Gallium Arsenide. The radiant energy emitted by such energy source has a high degree of frequency coherence. The smallness of the laser diodes, which can be built with the resonant cavities measuring less than a hundred of micrometers, eliminates the spatial coherence of the emitted radiant energy. The absence of spatial coherence is advantageous because it permits the emitted signal to be received by a large number of detectors of other microprocessors. In other embodiments of the present invention incoherent sources of radiant energy are used, such as semiconductor LEDs. Because radiant energy detectors can give response to the radiant energy in broad bandwidth, the main difference between the laser diode and an LED is in existence for the latter of a threshold current. The existence of the threshold current is not essential for the operation of the device embodying the present invention. For this particular embodiment of the present invention the laser diode 25 emits radiant energy in the near infrared region in a series of evenly spaced pulses. The number of the pulses in a separate emission is determined by the group velocity of propagation of the power supply radiant energy and by the length and Q coefficient of the laser diode. The number of pulses could be as low as one if the time of activation of the laser diode 25 is sufficiently small. The Q coefficient and the length of the laser diode cavity put another upper bound on the frequency of the power supply radiant energy. The threshold current for a GaAs laser diode could be as low as 1 mA or less with the operating voltage of few volts. For a device where between a thousand to ten thousand out of total of a million to ten millions of microprocessors, this means the total current of less than 10 A with voltage of few Volts. For microprocessor density of one thousand per square centimeter this implies the current density of less than 10 A per square centimeter squared. This is a quite acceptable current density from the point of materials constraints and efficient heat transfer away from the microprocessor assembly. Assuming that few percent of the power supply radiant energy is actually spent on creation of the activation voltages, the total power consumption by a device with described parameters will be on the order of few kilowatt. The power consumption does not depend on the total number of the microprocessors but only on the number simultaneously activated.

The input of the logical circuit 24 is the electrical signal, which is proportional to the aggregate radiant energy flux received by the detector 21 during the time when the detector 21 is activated. This signal is averaged by the logical circuit over a certain time scale, which can vary. This time scale determines the length of the input and output codes at a given microprocessor. The length of the code is in direct correspondence with the degree of connectivity of a given microprocessor. The output of the logical circuit is an instruction to the switch 20 to either increase or decrease the frequency of the "on" position of the switch. Since there are only few possible outputs from the logical circuit 24, it can have a small internal memory of equal to or less then 256 bites per processor. Thus each of the microprocessors is a cellular automaton.

Because the radiant energy sources emit signals into a common waveguide and the detectors absorb signals from the same waveguide a high degree of connectivity can be achieved, due to the fact that radiant energy signals do not interact with one another. If all of the microprocessors are activated at the same time then the degree of connectivity is comparable to the total number of microprocessors. Partial activation of the microprocessors by the propagating voltage pulse reduces this number to the one desired. The degree to which the radiant energy signal emitted by one microprocessor is processed by another depends on the degree of similarity between the corresponding output and input codes and on constant geometrical factors of their mutual position. Thus changing the input and output codes of microprocessors changes the relative magnitude of communication among the plurality of the microprocessors. Such change of information exchange magnitudes can be easily done because it can be done locally, by changing of the codes. This makes the operation time scale of the microprocessor assembly advantageously fast. For the degree of connectivity of ten thousand, the same as in the human brain, on needs the code length of about ten thousand of the basic pulses. This makes the system update time on the order of one millisecond. It should be noted that unlike the digital computers the system update time in neural network devices relates both to the speed with which the pattern recognition takes place and to the time scale of the change of the patterns which the system can recognize. For example the human brain cannot recognize patterns which change on the time scale faster than one hundredth of a second. At the same time the image recognition for the human brain also takes place on the time scale of a hundredth of a second.

Figure 4:
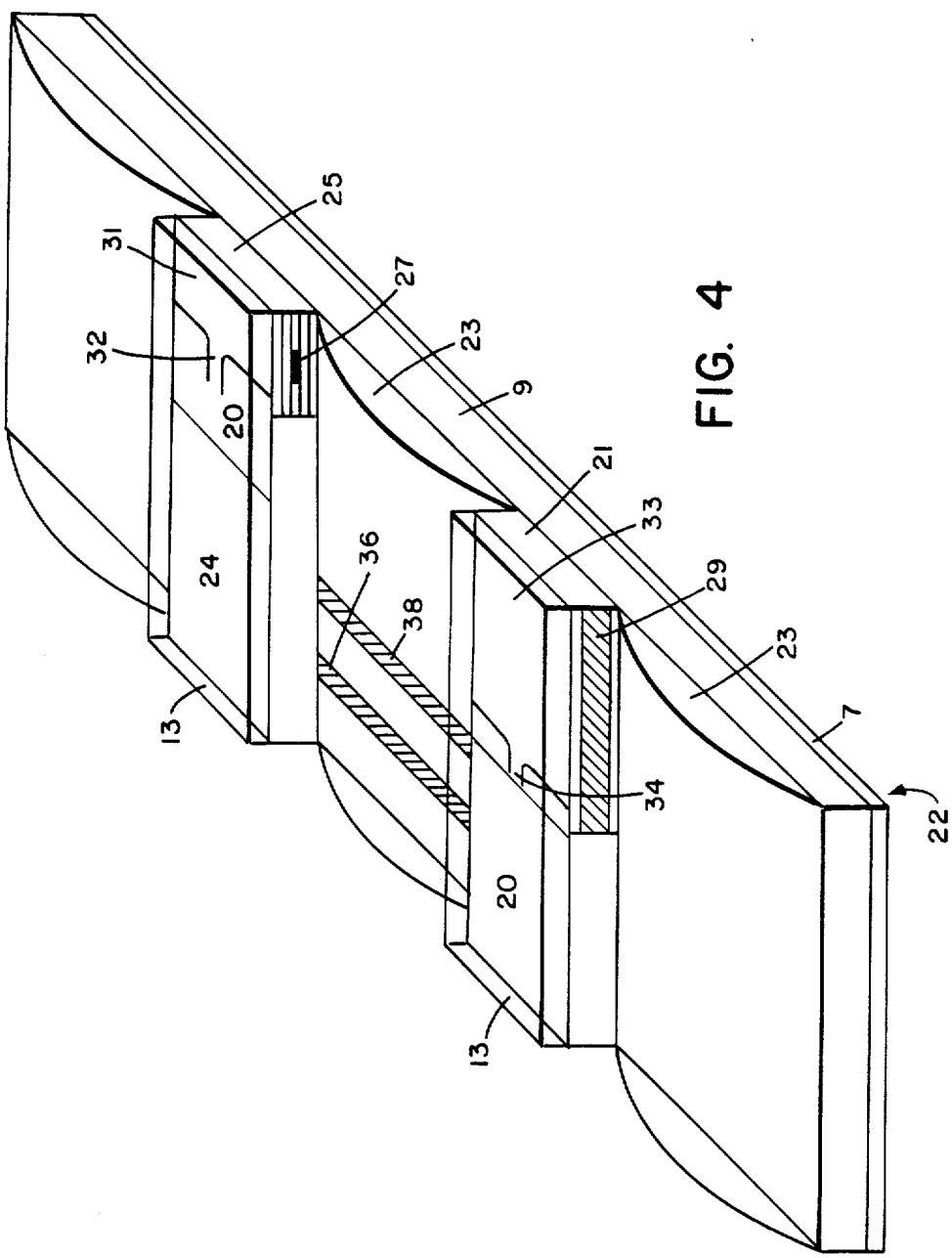
FIG. 4 is a view in perspective of a single microprocessor mounted on the power waveguide.

Referring now to FIG. 4, a single microprocessor 22 is shown together with sections of the deflection strips 23. The microprocessor comprises the double heterojunction laser diode 25, the photodetector PIN diode 21, switches 20, and the logical circuit 24. The top surfaces of the microprocessor are covered with a layer 13 of material, which has lower refractive index than that of the medium above the microprocessor, to induce total internal reflection for radiant energy rays with sufficiently low incident angle The top of the detector mesa 21 is covered with a thin layer of conductive material 33. A thin strip 34 of conductive material connects the conductive layer 33 with the switch 20. The top of the laser diode mesa is covered by a thin layer of conductive material 31. A thin strip of conductive material 32 connects laser diode 25 with switch 20. The logical circuit 24 abuts the laser diode mesa. Strips of conductive material 36 and 38 connect the logical circuit 24 with the detector switch 20 and detector 21. The conductive surfaces 33 and 31 are grounded. During the propagation of the radiant energy power supply, a voltage sufficient to activate the detector 21 and the laser diode 25 is generated between the surfaces 33, 31 and the conductive layer 7, which is the top part of the plurality of the power supply waveguides 1 on FIG. 1. When the switches 20 are in the "on" position, the vertical sides 29 of the detector 21 absorb radiant energy signals and the light emitting region 27 of the laser diode 25 emit radiant energy. The deflection strip 23 focuses the propagating radiant energy signal on the surfaces 29 and deflects the radiant energy emitted by the laser diode 25 to prevent coupling of the laser diode and the detector. Deflection strips 23 are fabricated by partial melting of a rectangular mesa of some material with an appropriate refractive index under the exposure of focused laser radiation. The fabrication methods of integrated optoelectronic circuits consisting of coupled photodetectorlaser diode arrays by liquid phase epitaxy were described in an article by Antreasyan at al. in IEEE Journal of Quantum Electronics, Vol. 7, p. 1064, 1986. The same methods can be applied for fabrication of the microprocessor assembly embodying the present invention. Typical size of the detector-laser pair is on the order of few hundred micrometers. Current available technology for fabrication of the electronic circuits uses the tools such as electron beam lithography or X-ray lithography, which are capable of resolution on the order of few micrometers. Thus the area of about a 100 micrometers by a hundred micrometers, left for the logical circuit 24 is sufficient to produce a simple analog logical circuit with internal memory 256 bites or less. The power supply for operation of the switches 20 and the logical circuit 24 come by induction of operating voltages by propagating voltage pulses. Laser diode 25 emits in both directions and detector 21 absorbs from both direction of voltage pulse propagation. This provides for two different modes of operation of the assembly: forward and back modes.

Figure 5:
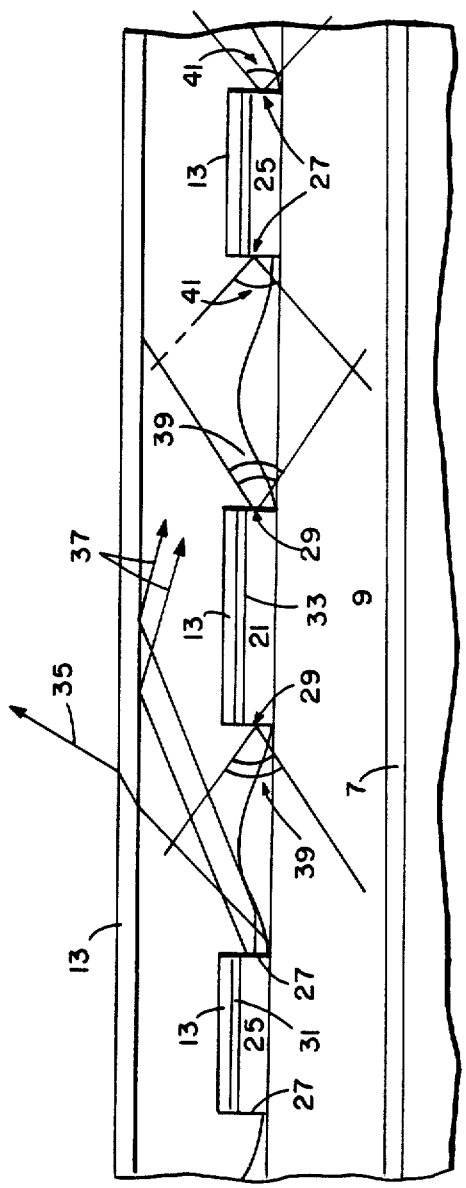
FIG. 5 is a cross-sectional view of the part of the assembly, shown in FIG. 1 in the plane 4—4.

Referring now to FIG. 5, a cross section of the microprocessor assembly is shown in the vertical plane defined by lines 4—4, which exhibits a periodical arrangement of detectors 21 and laser diodes 25 separated by deflection strips 23. The operating voltage is generated between conducting surfaces 31, 33 and the conductive layer 7. The substrate 9 supports the assembly of the microprocessors. The top portion of laser diodes and detectors is covered by a layer 13 of the transparent material with a refractive index lower than that of the medium 11 of the information exchange chamber. The layer 13 on the top of the data waveguide prevents the escape of the incident rays 37 of radiant energy with small incident angles. The rays 35 with large incidence angles escape through the layer 13. This is an advantageous situation because the rays with large incidence angles are caused by scattering of the radiant energy on the irregularities of the data waveguide and are not needed. The angle 39 depicts the vertical plane aperture of the radiant energy signals absorbed by the detector 21. Angle 41 depicts the vertical plane spatial incoherence of the laser diode 25. This spatial incoherence is advantageous because it permits higher degree of connectivity among microprocessors. Typical spatial incoherence is on the order of tens of degrees. Upon generation of the operating voltage and provided the switch 20 of FIG. 4 is "on", the detector 21 begins to generate electric current in response to the absorption of the radiant energy through the vertical surfaces 29. At the same time the laser diode 25 begins to emit radiant energy through the light emitting regions 27.

Figure 6:
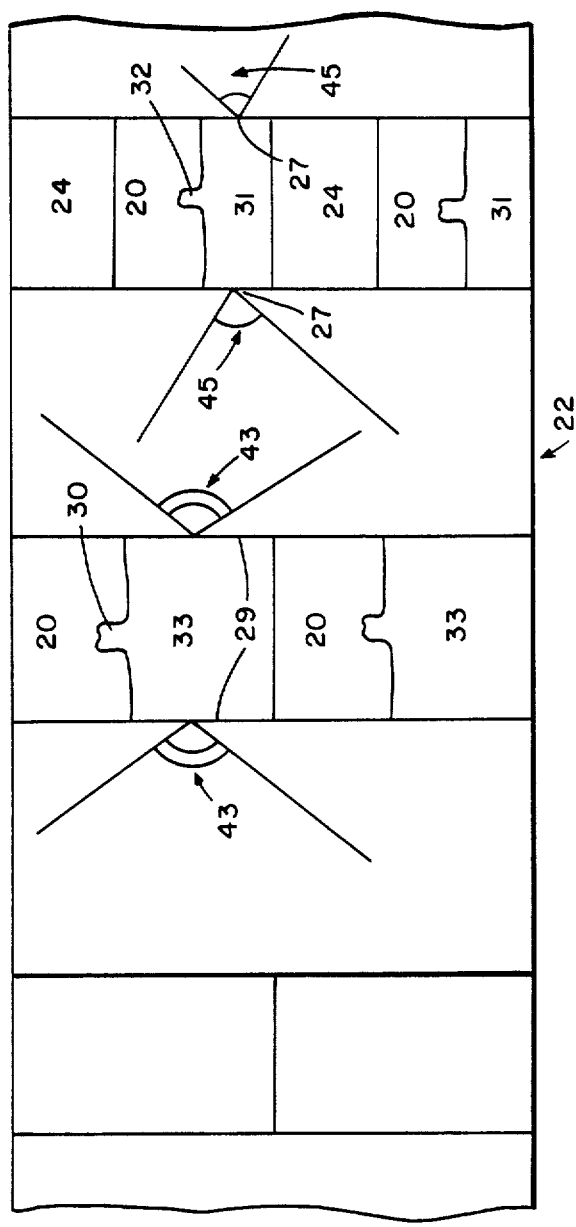
FIG. 6 is a view from above of the part of the array of microprocessors shown on FIG. 5.

Referring now to FIG. 6, a cross-section of the microprocessor assembly is shown in the plane defined by the lines 2—2 of FIG. 1. Angle 43 depicts the angle within which radiant energy signals can be absorbed by detector 21. This angle depends on the total reflection angle of the interface between the medium of the data waveguide and the material of the detector, which typically is on the order of few degrees. Angle 45 depicts the angle of horizontal spatial incoherence of the laser diode 25. Similar to the vertical plane spatial incoherence angle, this angle is about few tens of degrees.

Figure 7:
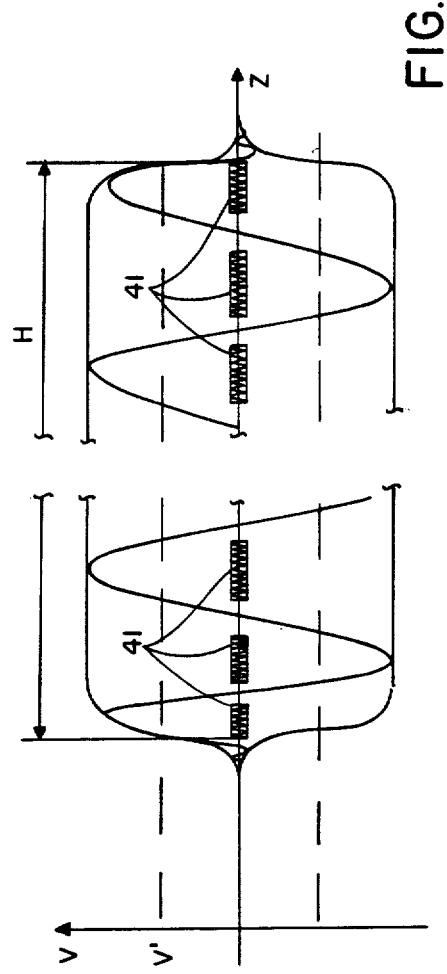
FIG. 7 is an illustration of selective activation of a part of the microprocessor array shown on FIG. 2.

Referring now to FIG. 7, an example of selective activation of the microprocessors along the z direction of FIG. 1 is shown. The amplitude of the propagating voltage generated by the power supply radiant energy exceeds the microprocessor activation voltage V' in the regions 41 above the waveguides 1 of FIG. 1. In this particular embodiment of the present invention, the activation voltage V' is determined by the threshold current of the laser diode of the microprocessor. Thus only the microprocessors situated above regions 41 can process the radiant energy signals. As the generated voltage pulse travels along the power supply waveguide, so do the regions 41. The speed of propagation of the voltage pulse can be varied in a broad range by varying the frequency of the power supply radiant energy, because the group velocity of the power supply radiant energy depends on the difference between the cutoff and the used frequencies of the power supply radiant energy. The number of the regions 41 can be varied by varying the width H of the radiant energy pulse.

Figure 8:
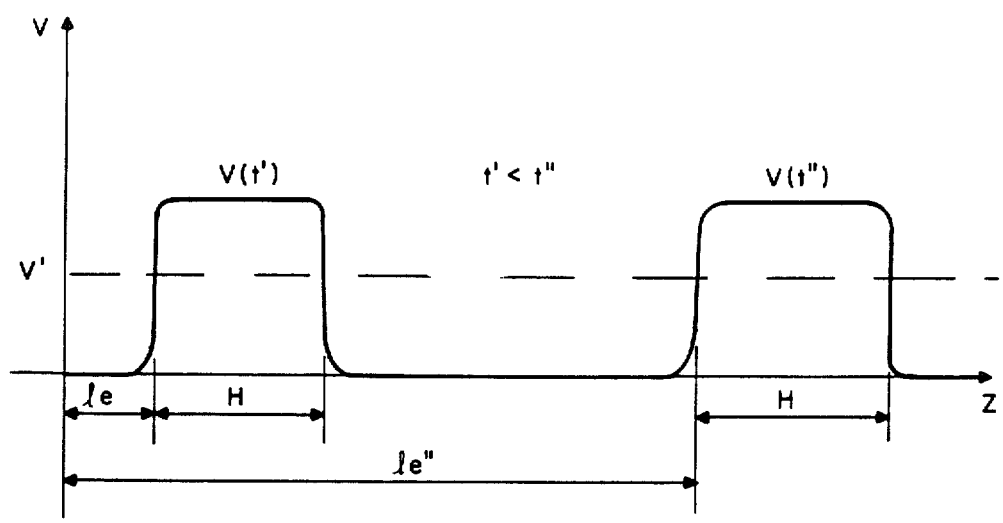
FIG. 8 is an illustration of the effective connectivity pattern of selectively activated microprocessors due to the propagation of the voltage pulse in the power waveguide.

Referring now to FIG. 8, an example is shown of the effective connectivity pattern in the z direction of FIG. 1, which is generated by the propagating power supply radiant energy pulse. If at time $t'$ the pulse was at a distance $l'$ from the end of the power supply waveguide and at a later time $t''$ at a distance $l''$, then in order that the microprocessors activated by the voltage $V(t'')$ were able to process signal from the microprocessors activated by $v(t')$, it is necessary the time of travel of the signal emitted by the microprocessors activated by $V(t')$ be equal to the time of the travel of the voltage pulse from the distance $l'$ to the distance $l''$ from the end of the power supply waveguide. Varying the group velocity of the power supply radiant energy it is possible to vary the connectivity pattern in the z direction of FIG. 1.

Figure 9:
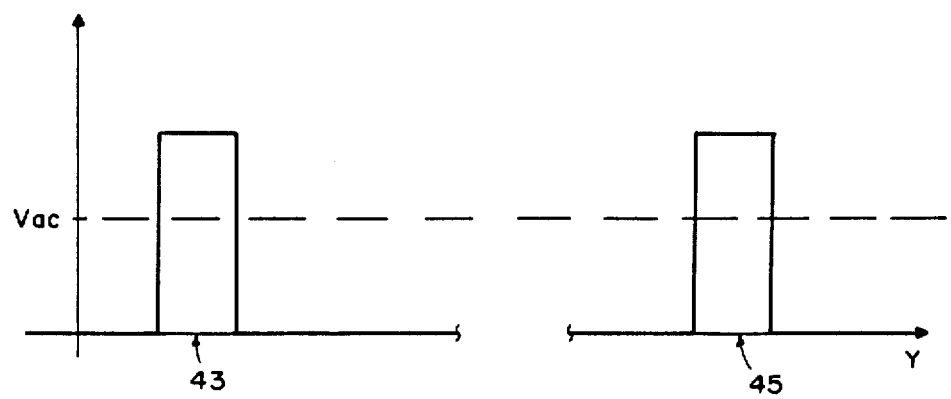
FIG. 9 is an illustration of the selective activation of some of the microprocessors in the direction perpendicular to the line of propagation of the voltage pulse.

Referring now to FIG. 9, an effective connectivity pattern in the y direction of FIG. 1 is shown. This is achieved by sending the power supply radiant energy only into power supply waveguides 43, 45 and not into the others. Thus only the microprocessors situated above the power waveguides 43 and 45 will be activated and will process each others signals. Varying the number of the waveguides through which a power supply radiant energy propagates makes it possible to generate a wide range of different connectivity patterns in the y direction of FIG. 1. Because more than one microprocessor is situated above a power waveguide in the y direction, more then one microprocessor will be activated simultaneously. For the power supply radiant energy wavelength on the order of 1 cm, there will be at least few dozens of microprocessors activated at the same time. This is an advantageous situation because it adds to the robustness of the assembly by increasing its fault tolerance and tolerance to failure of few of the microprocessors elements.

Referring now to FIG. 10, the fabrication of the deflection strip 23 is shown through application of the focused laser radiation applied to a rectangular mesa 47. The material of mesa 47 is chosen such that it wets the substrate 9 when it is melted. This will result in the shape of the deflection strip which is necessary for the focusing of the data radiant energy on the detector 21 and deflection of the signal emitted by the laser diode 25 into the data waveguide.

The invention claimed is:

1. An integrated electronic circuit assembly forming an adaptive communications network with changeable connectivity pattern, comprising:

an assembly comprising in the order of one thousand or more preprogrammed microprocessors each comprising: a radiant energy detector, a radiant energy source, an analog logical circuit, one or more switches, and a plurality of electrical interconnections;

a common radiant energy data channel into which said radiant energy sources emit and from which said radiant energy sources absorb radiant energy signals;

means for feeding external data into said radiant energy data channel;

means for modulation of the radiant energy emitted by said radiant energy sources according to output codes assigned to each said microprocessor;

means for demodulation of the radiant energy, absorbed by said radiant energy detectors, according to input codes assigned to each said microprocessor to provide decoded inputs which are functions of the aggregate energy in the radiant energy channel from plural microprocessors received by the radiant energy detectors;

means for changing said input codes and output codes according to a rule which depends on the demodulated input of each of said radiant energy detectors;

an array of one or more radiant energy power supply waveguides which simultaneously energize groups of microprocessors selectively to provide a changeable connecting pattern.

2. An integrated circuit assembly as defined in claim 1, wherein the assembly of microprocessors is a two dimensional array.

3. An integrated circuit assembly as defined in claim 2, where the two dimensional array of microprocessors serves as the radiant energy power supply waveguide.

4. An integrated circuit assembly as defined in claim 2, where said common radiant energy waveguide shares one of its surfaces with part of the surface of said two dimensional array.

5. An integrated circuit assembly as defined in claim 2, where a layer of conductive material is deposited on one of the two horizontal sides of said array.

6. An integrated circuit assembly as defined in claim 5, where said conductive layer comprises part of the conductive walls of said radiant energy power supply waveguides.

7. An integrated electronic circuit assembly as defined in claim 1, further comprising a plurality of deflection strips which deflect energy from the waveguide to the detectors.

8. An circuit assembly as defined in claim 1, where said input and said output codes are binary codes.

9. A integrated circuit assembly as defined in claim 1, where said input and said output codes are integer-valued codes.

10. An integrated circuit assembly as defined in claim 1, where said radiant energy source is a laser diode.

11. An integrated circuit assembly as defined in claim 1 wherein said radiant energy source is a light emitting diode.

12. An integrated circuit assembly as defined in claim 1 wherein said radiant energy detector is a PIN photodetector.

13. An integrated circuit assembly as defined in claim 1 where said radiant energy detector is an avalanche photodetector.

14. An integrated electronic circuit assembly as defined in claim 1 where said assembly of microprocessors is a two dimensional array of microprocessors composed of one dimensional arrays of microprocessors.

15. An integrated circuit assembly as defined in claim 1 where said common radiant energy waveguide is a hollow shell filled with a transparent gaseous substance.

16. An integrated circuit assembly as defined in claim 15 where said gaseous substance is replaced by a transparent liquid.

17. An integrated circuit assembly as defined in claim 1, where said common radiant energy waveguide is composed of two or more solid substances, one or more of which is transparent to said radiant energy.

18. An integrated circuit assembly as defined in claim 1, where said rule for changing said input codes depends on said deomodulated input averaged over a certain time.

19. An integrated electronic circuit assembly as defined in claim 1, where said logical circuit is a digital circuit with internal memory less than or equal to 512 bytes.

20. A method of inducing of changeable connectivity pattern among a plurality of microprocessors comprising:
arranging said microprocessors into two dimensional arrays;
subjecting said arrays to pulses of radiant energy of varying frequency and duration;
inducing activation voltages in said microprocessors by said pulses of radiant energy.

21. A method of changing the magnitude of information exchange among a plurality of microprocessors comprising:
representing said information in the form of modulated radiant energy;
arranging said microprocessors to emit said radiant energy into a common radiant energy channel;
arranging each microprocessor to absorb radiant energy from said common radiant energy channel by a detector;
encoding said emitted radiant energy according to output codes assigned to each said microprocessor;
decoding said absorbed radiant energy according to input codes assigned to each said microprocessor to provide a decoded input which is a function of the aggregate energy in the radiant energy channel from plural microprocessors received by the detector; and
making changes in said input codes and output codes to depend on the decoded input of each said microprocessor.

22. A method of changing the magnitude of information exchange among a plurality of microprocessors as defined in claim 21, where said input and said output codes are binary.

23. A method of changing the magnitude of information exchange among a plurality of microprocessors as defined in claim 21, where said input codes and said output codes are integer valued.

24. An adaptive communications network comprising:
a plurality of processors; and
a radiant energy communication channel coupling the processors;
each processor transmitting radiant energy into the communication channel as a function of its present state, and each processor receiving a portion of the aggregate radiant energy, transmitted by plural processors and received by a detector, as a function of its present state, the state of each processor being adapted to the received portion of the aggregate energy.

25. A network as claimed in claim 24 wherein the communication channel is an optical waveguide.

26. A network as claimed in claim 24 wherein the received portion of the aggregate radiant energy is a function of the match in an input switching code of the receiving processor and output switching codes of plural transmitting processors.

27. A network as claimed in claim 24 further comprising means for selectively enabling groups of processors to provide a changeable pattern of processors connected through the radiant channel.

28. A network as claimed in claim 27 wherein the means for selectively enabling groups of processors comprises an enabling waveguide array separate from the communication channel.

29. A network as claimed in claim 28 wherein the enabling waveguide array is a power supply to the processors.

30. A network of changeable connectivity pattern comprising:
a radiant energy communication channel;

a plurality of processors which communicate by broadcasting radiant energy in the communication channel; and means for selectively enabling processors to detect radiant energy from the communication channel.

31. A network as claimed in claim 30 wherein the means for selectively enabling comprising at least one enabling waveguide.

32. A network as claimed in claim 31 wherein the means for selectively enabling comprises an array of enabling waveguides.

33. A network as claimed in claim 31 wherein the at least one enabling waveguide is a power supply to the processors.

34. A network as claimed in claim 30 wherein the communication channel comprises an optical waveguide through which processors communicate simultaneously.

35. An adaptive network of changeable connectivity pattern comprising:

a plurality of processors which communicate adaptively; and at least one radiant energy waveguide for transmitting enabling signals to the processors to enable the processors for communications.

36. A network as claimed in claim 35 comprising an array of waveguides for transmitting enabling signals.

37. A network as claimed in claim 35 wherein the at least one radiant energy waveguide is a power supply to the processors.

38. A network as claimed in claim 35 further comprising an optical waveguide through which the processors communicate.

39. An adaptive communications network implementing a neural network comprising:

a plurality of processors;

means for adaptively modifying the information exchange between plural processors; and means for selectively establishing communications between plural processors independent of the means for adaptively modifying.

* * * * *

UNITED STATES PATENT AND TRADEMARK OFFICE
CERTIFICATE OF CORRECTION

PATENT NO. : 4,809,193

DATED : February 28, 1989

INVENTOR(S) : Robert F. Travares

It is certified that error appears in the above-identified patent and that said Letters Patent is hereby corrected as shown below:

The term of this patent subsequent to February 28, 2006, has been disclaimed

Signed and Sealed this

Twenty-seventh Day of February, 1990

*Attest:*

JEFFREY M. SAMUELS

*Attesting Officer*    *Acting Commissioner of Patents and Trademarks*